United States Patent
Oudakker et al.

(10) Patent No.: US 6,240,851 B1
(45) Date of Patent: Jun. 5, 2001

(54) TRANSPORT SYSTEM

(76) Inventors: Gerrit Oudakker, Taling 5, NL-1721 DC Broek op Langedijk (NL); Kurt Leitner, Brennerstrasse 34, I-39049 Sterzing-Vipheno (IT); Cornelis Christiaan Bernardus Grimbergen, Camphuysendreef 29, NL- 2353 CH Leiderdorp (NL)

( * ) Notice: Subject to any disclaimer, the term of this patent is extended or adjusted under 35 U.S.C. 154(b) by 0 days.

(21) Appl. No.: 09/077,602

(22) PCT Filed: Oct. 18, 1996

(86) PCT No.: PCT/NL96/00408

§ 371 Date: Jun. 2, 1998

§ 102(e) Date: Jun. 2, 1998

(87) PCT Pub. No.: WO97/14595

PCT Pub. Date: Apr. 24, 1997

(30) Foreign Application Priority Data

Oct. 20, 1995 (NL) .................................................... 1001470
Feb. 14, 1996 (NL) .................................................... 1002345
Jun. 13, 1996 (NL) .................................................... 1003339
Sep. 16, 1996 (NL) .................................................... 1004037

(51) Int. Cl.$^7$ ...................................................... B61B 15/00
(52) U.S. Cl. ...................................... 104/127; 104/130.01
(58) Field of Search ................................. 104/76, 77, 88, 104/127, 130.01, 130.04

(56) References Cited

U.S. PATENT DOCUMENTS 3,918,367 * 11/1975 Alimanestianu et al. ............. 104/88
5,069,140 * 12/1991 Glassey .................................. 104/28

* cited by examiner

Primary Examiner—S. Joseph Morano
Assistant Examiner—Robert J. McCarry, Jr.
(74) Attorney, Agent, or Firm—Young & Thompson

(57) ABSTRACT

Transport system with a transport track (1) along which one or more transport elements (2) (cabins) are moveable, said track (1) running over a substantial horizontal distance, and at least two horizontally spaced stations, for loading and unloading persons and/or goods from the cabin, said stations being at a different vertical level of at least several meters, and the transport track brigdes the said level difference through a relatively steep course and preferably the transport track (1) and/or the cabin are mutually adapted such that the passenger comfort is secured along the part of the track where the level difference is bridged.

18 Claims, 5 Drawing Sheets

Figure 4:
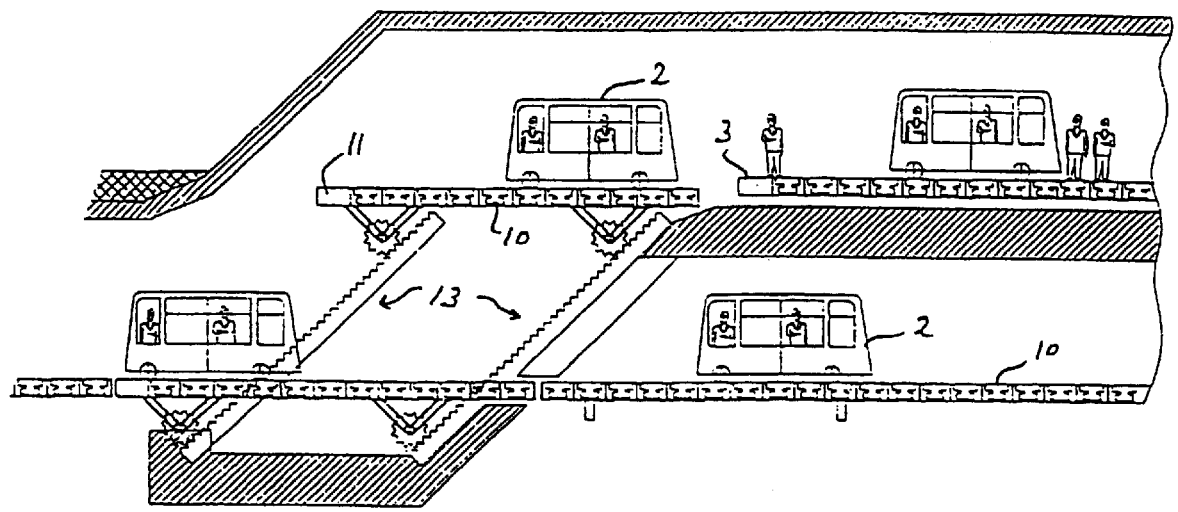

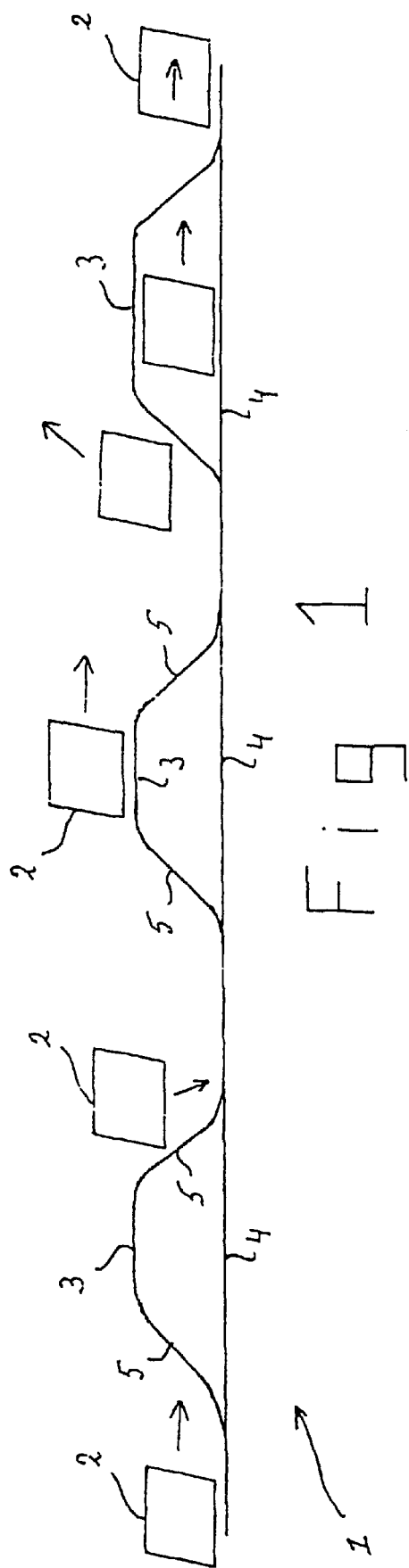
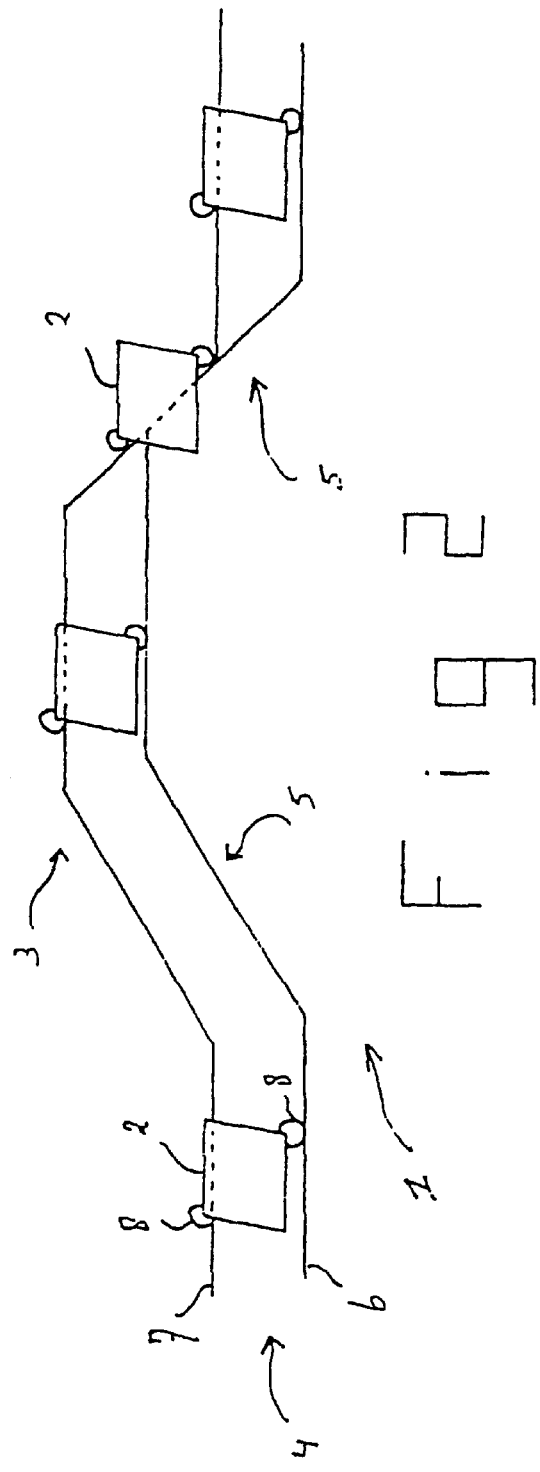

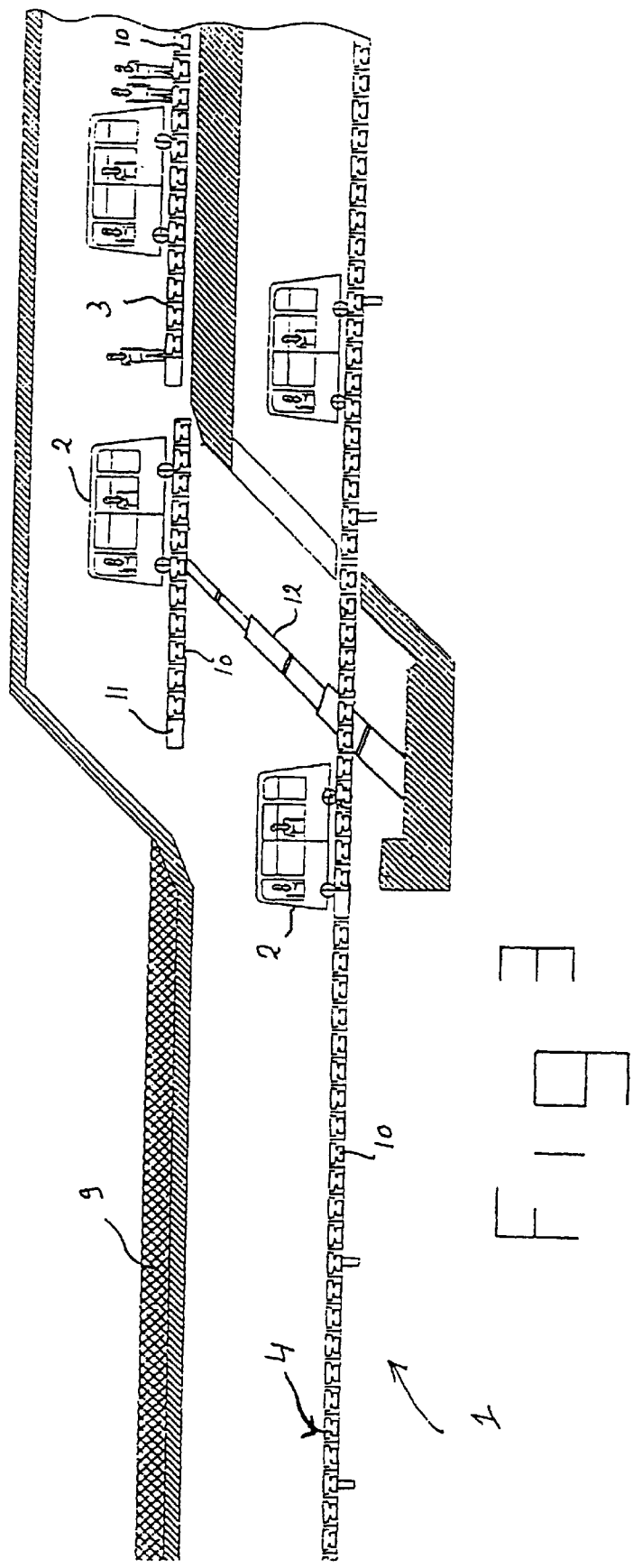

TRANSPORT SYSTEM

The subway is selected as the public traffic for transport of much people in area's of dense urbanisation, said subway is characterised by an own track going above or below the already existing traffic. In some cases there is even an own track at ground level, however this is excluded from the concept as described. We restrict ourselves to subways below ground level, although the same method can be used for subways on a high level.

A feature of the known system is that both the subway track and the stations are under the ground. An alternative is to keep the track under the ground, while the stations are brought up. A practical drawback of this is that a typical subway has stations rather close to each other such that virtually there are merely inclined track parts between the stations because the present carriages of the subway vehicles allow for only very shallow inclinations for passenger comfort.

It will be different if we start with small vehicles that follow each other with only a small time lapse. The typically rather lengthy subway vehicle is devided into seperate cabins that drive individually, so as to speek. This systems as such is not novel. This systems is found at airports, and is called "people mover". Also, there are systems with small shuttles pulled by cables of which the velocity is lowered at the change-over cites, such that entering and exiting the shuttle can be done safely. Such systems are merely economically feasible if the control is automatically, such that a shuttle does not require an individual for the control. In recent years, the automatic control with computerised sensing and evaluating has made this technically feasible and acceptable from a safety point of view.

The present invention is concerned with application of the above mentioned small shuttles or cabins, that move throug e.g. a tunnelpipe under the ground, but these shuttles are raised to the stations along a steep ramp, while the shuttles remain horizontal, such that the passenger comfort is guaranteed. At the stations, the shuttles can be observed as an elevator. Afterwards, the shuttle moves further, and preferable is lowered to the preceeding level. To keep the shuttle horizontal, one can make the front wheels ride on an inclined track different from that for the back wheels, the front wheels having a smaller distance between them compared to the back wheels. During lowering, this is the other way around. For this purpose, a switching mechanism is provided. The mechanical implementation of this mechanism is not subject of this invention, but the concept of:

small shuttles following each other with a small time lapse;

driving below ground level;

changeover by entering or exiting the shuttle above the ground.

Contrary to underground stations the advantages with the invention are:

No permanent illumination;
no ventilation;
no stairs and moving stairs;
no elevator (for wheel chairs);
improves social security.

Because the systems uses small shuttles, smaller than a standard subway train, the tunnelpipe can be small; like a big sewer. Since this is cheaper to construct, the grid-density can be made higher for the same financial investment. Since all provisions are small, the implementation in historic city area's will become easier.

Because of the small time intervals between the shuttles, the passengers have practically no waiting time. Since there is no waiting time there is no need for providing a waiting room, such that the space needed can be much smaller compared to standard stations.

It is preferable to select a proper architectual adaption for the stations, for instance by integration with a telephone box, kiosk, ticket seller, etc. The manager of the kiosk can e.g. have free use of it, if he will also inspect for reasons of security. The manager of the kiosk does not have to come in between if there is thread, however has a red emergency button, such that he is immediately in a position to call the subway police that is driving around in the neighbourhood.

It is an object of the invention to provide a transport system such that with a reletively high frequency, for as low investments as possible, persons can be transported comfortably. It is another object, to enter or exit a transport element at the one level, and to do the essential transport with said element substantially at another level, differing substantially from the said one level, for a low price and small consumption of space. It is a further object to make the bridging of the different horizontal levels as comfortably as possible for a price as low as possible, such as investments and maintenance. It is another object of the invention to have a combination of the solutions of one or more of the above mentioned objects.

These and other objects will appear from reading this description, and the drawings and claims as enclosed. The invention is mainly directed to a transport system, in which transport elements (shuttles), move along a substantially rigid guide and for instance hang therefrom or rest thereon. However, one can imagine, that a more flexible guide, such as a suspension cable -known as such with cable lifts in mountain area's to bridge large horizontal or vertical distances- is used, the shuttle hanging from such cable. One can imagine combinations as well, in which parts of the track are made by cables or other flexible or yielding guides, while other parts are made by substantially rigid guides, such as train rails etc. Use of merely rigid guides is perferred, since this allows for a curved track at low price. Another advantage over a hybrid system is that it contains no complex changes. The comfort is better compared to a cable lift as well.

Figure 7:
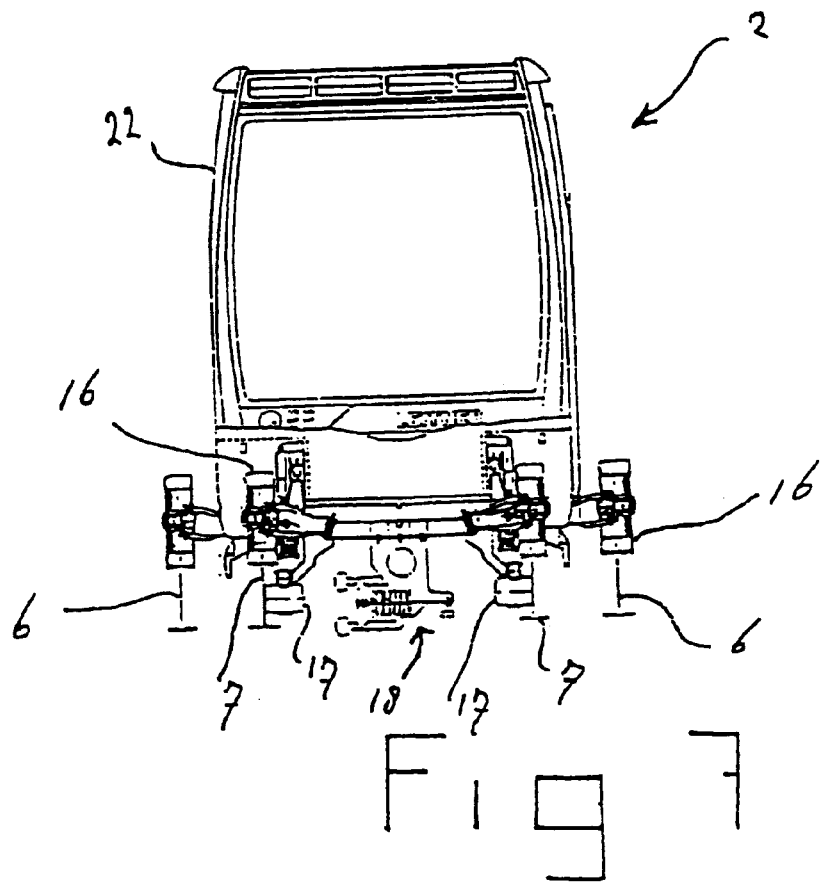
Figure 9:
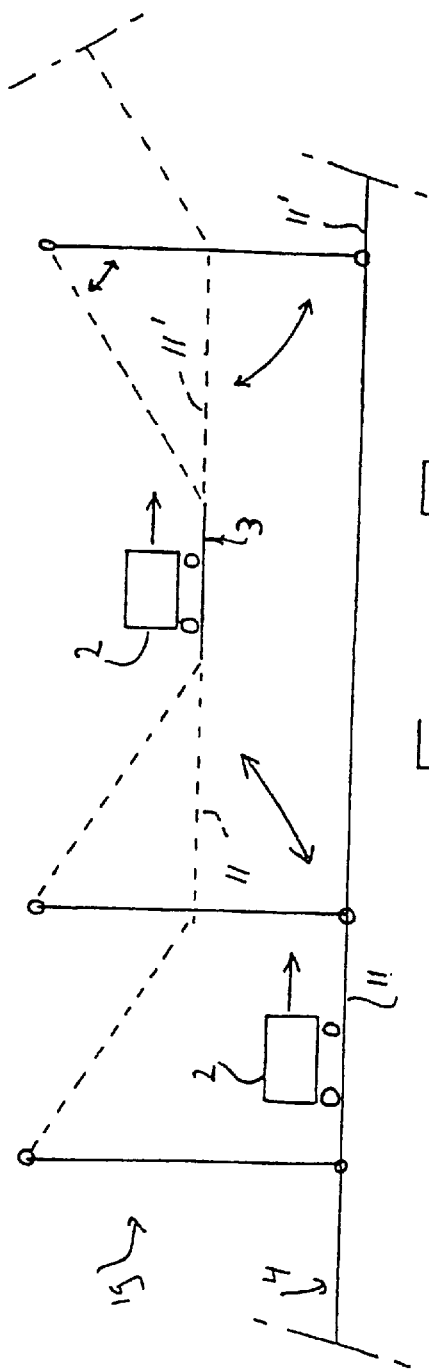
Figure 10:
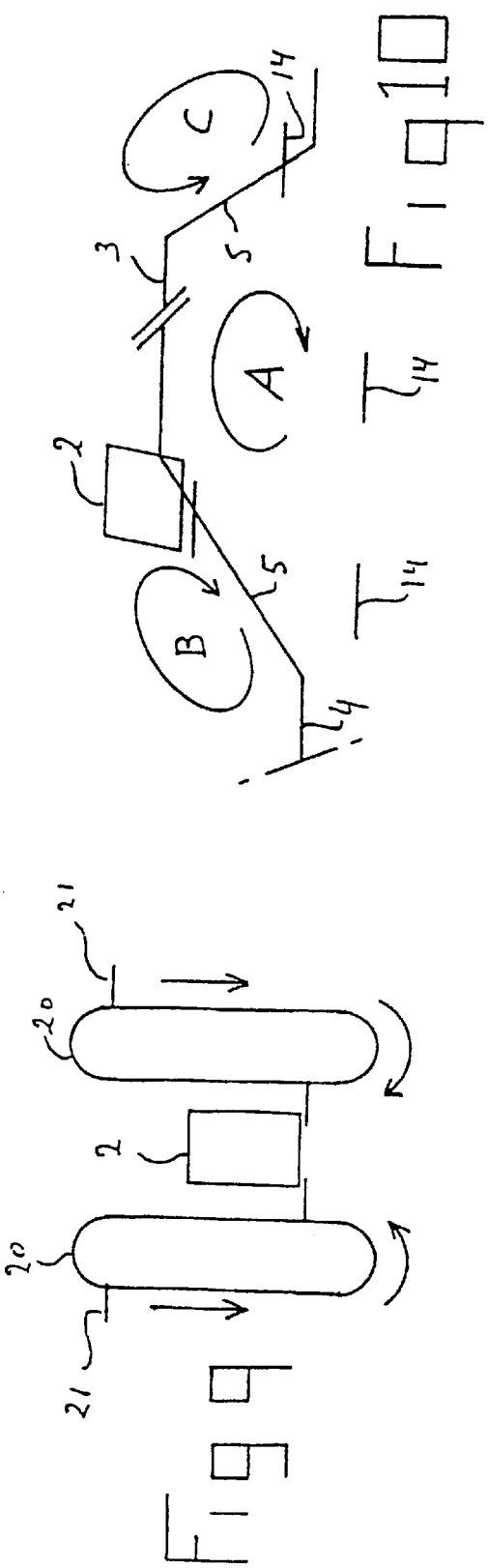
Figure 11:
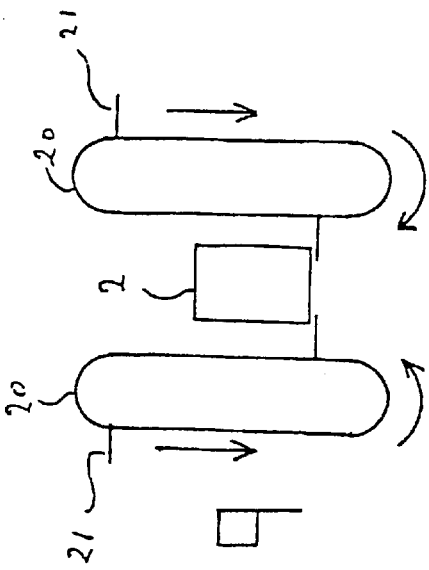

The invention will now be described referring to the enclosed drawings of non-limiting examples. In the drawings is:

FIG. 1 a side elevational view of a part of a schematical illustration of the invention;

FIG. 2–6 each time a side elevational view of a first, second, third, fourth and fifth, respectively, preferred embodiment;

FIG. 7 a front view of a cabin or shuttle to be used with the invention;

FIG. 8–10 each time a side elevational view of a sixth, seventh and eigth, respectively, preferred embodiment. In the drawings, the shuttle is moving forward from left to right.

FIG. 1 shows a track 1 along which units 2 (shuttles) for the transport of goods and in particular persons are moving. The shuttles have a relatively short dimension, in the order of magnitude of common cabins for cable lifts and are adapted to contain for instance 20 persons. As shown, the track extends over more than one horizontal level; in this particular case two horizontal levels. In the illustrated embodiment each time a shuttle 2 can go from a lower level 4 to a higher level 3 through a ramp 5. Three up- and -down tracks are shown, which means tracks in which a shuttle rises from level 4 to level 3 and then back to level 4. De invention contemplates a track with at least one such up- and -down track. An up- and -down track can also be one wherein from a lower level subsequently risen is first to an intermediate level and than to an end level, and thereafter to come back to the initial level, etc. -possibly by first stopping at the intermediate level again-. Level 4 can be under the ground and level 3 can be above the ground. The distance between the levels 3 and 4 can be e.g. 6 meters. This distance is preferably the common mutual level-difference for two crossing subway lines, a subway line and a traffic path on ground level, multi-level crossings, etc. It will be appreciated that the preferred differences in level are comprised between several meters and some ten meters. Such differences in level are to be bridged relavtively quick, with acceptable comfort to the passengers.

At level 3 there can be e.g. a station for exiting and entering each time. Such stations can be present at level 4 as well. It is shown, how it is possible to make a choice for a shuttle 2 to divert from level 4 to reach level 3. To keep the space consumption as minimum as possible for the track at level 3, the shuttle 2 will, after level 3 is reached, go back to level 4 through a track as short as possible. The track extends over a horizontal distance which is preferable several hundreds of meters, and is more preferably comparable to common public transport systems, such as the subway, the bus or the train, with distances of several kilometers or some ten or even hundreds of kilometers or more. The shuttles preferably move vise versa along seperate tracs between the stations. As such, the illustration of FIG. 1 can be regarded as one of those two seperated tracs. The horizontal distance between the stations measures preferably at least some ten of meters. A spacing between the stations of several hundred meters or some kilometers is feasible as well. The spacing between stations is typically not constant for all stations.

The shuttles each time move along the one ramp 5 to level 3, and return to level 4 along the other ramp. In this illustration, the track is substantially at level 4. This situation can be inverted as well, e.g. in which the level 3 is high above ground level, and the stations at level 4 are at ground level. It will be appreciated that, for securing the passenger comfort, the shuttles are maintained in as much a horizontal attitude as possible; this counts for rising and descending along the ramps 5 between the levels as well. To further guarantee the comfort, it is preferable that the travel along the track 1 is as much smooth as possible, with as minimum strong accelerations and decelerations as possible. A prefered forward velocity is between 5 and 15 m/s. The most preferred speed at this moment is between 7 and 10 m/s. A preferred movement along the track 1 is as follows: when moving at level 4, the shuttle is decelerated to between 0.5 and 2 m/s when arriving at the vicinity of the ramp 5, after which the ramp 5 is passed at such speed, and the shuttle finally comes to a stop at level 3. After changeover of the passengers, the shuttle is accelerated at level 3 to e.g. between 0.5 and 2 m/s, and after the ramp 5 is passed, the shuttle is accelerated further to the typical speed at level 4. It is feasible-as well, even during entering and exiting of passengers, to maintain a forward velocity. The acceleration and deceleration can be done with known systems, as with cable lift systems. The propulsion is preferebly provided by pulling cables or other flexible pulling elements, as is known as such from cable lift systems. The inclination of the ramp is preferably an optimization between the opposite requirements for small space consumption and passenger comfort. Said inclination is preferably between 20° and 45°. A preferred inclination is comparable to the inclination of stairs in public area's, such as station buildings etc. The shuttle 2 preferably rides, as with the embodiment of FIGS. 2–4, with four wheels, two at the front, two at the back, on both sides of the longitudinal axis and preferably with the same gauge on a course. The travel course can have the width of the gauge of the shuttle, but can also, such as with e.g. rails for trains, be comprised by two parallel travel courses of about the width of the wheels, and in line with those wheels. The travel course can e.g. be provided by train rails or equivalent, and the wheels of the shuttle are e.g. adapted to the type of travel course. FIG. 2 shows an embodiment in which the shuttle is guided along two parallel, typically vertically spaced, substantially rigid fixed guides 6, 7. The vertical distance between them amounts approximately e.g. the height of the shuttle 2. The shuttle has horizontally spaced supports, here at the front and the back, for engagement with the guides 6 or 7, to remain horizontal along the ramps 5. The shuttle preferably moves along said guides 6, 7 with as minimum resistance as possible, such that the shuttle is preferably provided with wheels 8. To keep in balance, the shuttle 2 has at least one set of wheels on both sides of its centre of gravity. In the situation as shown here, at the descending ramp 5 -on the right hand side of the drawing- the guides 6, 7 cross each other. The embodiment as a mirror image of FIG. 2 is feasible as well.

FIG. 3 shows an alternative for as good as possible horizontally bridging the different levels. In here it is illustrated as well, that the level 4 is below the ground in a tunnel pipe 9. Reference number 10 indicates an accelerate/decelerate device which is known as such, a rotating body (wheel) of which engages at a side of the shuttle 2 for acceleration or deceleration or moving forward at constant speed. By the large amount of bodies 10, accurate control of the amount of acceleration or deceleration is possible. Furthermore, there is a lifting platform 11. This platform 11 can move between the levels 3 and 4 with the aid of a lifting element 12 (e.g. a hydraulic jack). By lifting the platform under an angle (as is shown here), this will move forward, and said movement can be added to that of the shuttle, which is advantageous for the comfort. With the descending ramp (not visible), the action of the lifting device is preferably such that an advantageous forward movement of the platform is given as well. The platform 11 is preferably provided with accelerating/decelerating means as well, engaging the shuttle. In this way one has a maximum course length for accelerating/decelerating, sine accelerating/decelerating is possible with the platform too. It is further preferable to give the platforms a length substantially larger than that of the shuttles, also such that the shuttles can maintain a certain speed. The length of the platform is preferably at least twice, more preferably at least three times the length of a shuttle.

FIG. 4 shows a variant of FIG. 3, in which a toothrack is used for lifting the platform 11. Other embodiments for lifting and lowering are feasible. It is e.g. possible as well that merely for lifting and lowering purposes, the shuttle is suspended by (e.g. hanging from) a cable lift.

Figure 5:
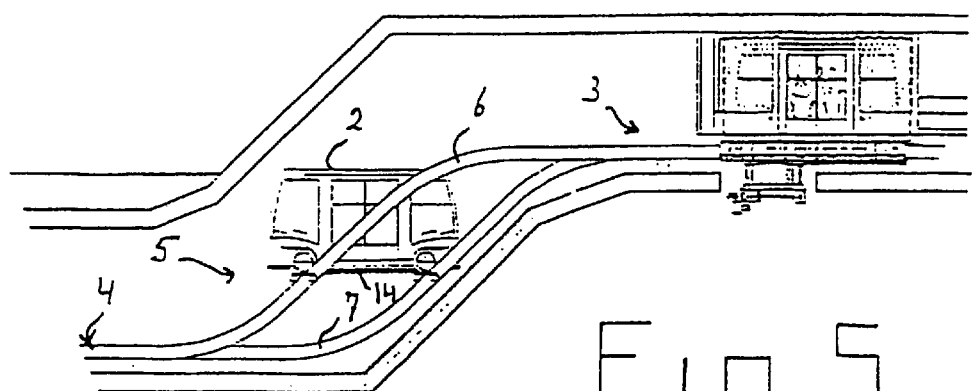

FIG. 5 shows an embodiment in which the guides 6, 7 are seperated from each other in the inclined parts 5, and have a different profile in side view, however they meet each other at the ends. Said guides support at least one supporting platform 14, of which one is shown in the drawing. Such platform 14 is adapted to support a shuttle 2. Each platform has at both sides of the longitudinal axis front and back wheels or equivalent ride- or slide supports with the guides 6, 7. By co-operation with the guides 6, 7 the platforms keep a substantial horizontal attitude. A platform 14 carries e.g. a shuttle merely in the inclined parts 5, but it is possible too that a platform picks up the shuttle at level 4, brings it to level 3, supports the shuttle there as well, and brings it back to level 4. The plateaus can circulate for one up- and -down track, as schematically shown in FIG. 10. The circulation can be such that the platforms 14 pass both ramps 5 (circulation A in FIG. 10). It is possible as well, that the one group of platforms 14 passes merely the upstream ramp 5 (circulation B), and another group passes merely the downstream ramp 5 (circulation C). With the circulations B and C, the shuttle bridges the space between the ramps 5 at level 3 without a platform. For circulation A it is shown in FIG. 10, how the platforms 14 are moved back below level 4 to the starting position at the lower end of the upstream ramp -on the left hand side in the drawing-. It will appreciated that such circulation principle is feasible for other types of lifting, such as shown in the drawings, as well. The guiding in circulation can be done with means known as such, and form no complication for the skilled person. In the embodiment according to FIG. 5, the gauge of the wheels or other ride or slide supports of each platform is adjustable, for adjustment to the guide 6 or 7, especially if the platforms pass both ramps.

The course part 7 is closer to the longitudinal axis compared to the course part 6. When rising, the front wheels are therefor shifted inwards. Shifting the front or back wheels inwards from their initial position can be done in several ways. For instance mechanically controlled with a spigot (not shown), projecting from the course at the highest and the lowest position of the lifting/lowering part. That spigot engages a switch mechanism (not visible) below the platform, if the platform passes the spigot. Then one of the wheel pairs is brought inwards through a coupling, and at the highest point the other wheel pair (front or back wheels) is brought inward. The spigot can be provided on the platfrom as well, and the switch system on or at the track. Another possibility for adjustment of the wheels is e.g. with a electric motor controlled by a wireless communicated signal at the moment that it is necessary to bring the wheels inward and/or outward. If it is concerned with such possibilities for adjustment, reference is made to CH-A-518.824, of which the description is inserted here by reference. There it is described and shown a system for disengaging of wheels clamped on both sides of a shaft of a train carriage, to adjust the width between the rails. Disengagement takes place by actuating with a spigot element passed by the shaft. Then the wheels are adjusted for another width between the rails. If the spigot element is removed, the wheels are engaged with the shaft again. The wheels or other shift or slide supports of the shuttle 2 for engagement with the guides can be provided for adjustment of the gauge. Then there are no platforms needed to bridge the different levels. Then the shuttle is directly supported by the guides 6, 7. Outside the area's with the guides 6, 7 it is preferred then, that the wheels on the one side of the shuttle are supported by the same guide, which gives an important saving of material. Then the wheels are mutually in line. The advantage of the use of supporting platforms 14 is that with it there is no need for special provisions on the shuttle for lifting/lowering it horizontally, which is advantageous for the costs. If such provisions are provided on the shuttle, the comfort along the complete track is better ensured.

Figure 6:
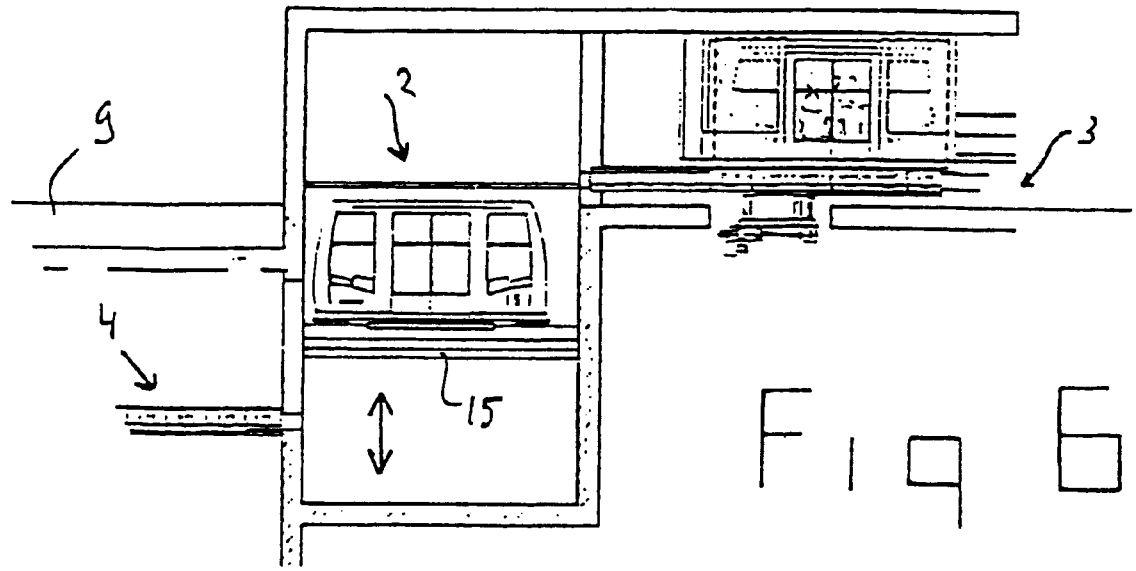

With the embodiment according to FIG. 6 a substantially vertical operating elevator or lifting device 15 is used to bridge the different levels. Such is moved up and down in a known manner by hydraulic jacks or a scissors system, both known as such. The length of the lifting platform, on which the shuttle rides on and off, of that lifting system is preferably such that during bridging the levels, the shuttle is not forced to completely stop on the platform. This is advantageous for the passenger comfort. The typical velocity of the shuttle is 7 m/s for long distances. For instance just ahead of the elevator this velocity is e.g. lowered to 3 m/s, and if supported by the elevator, the speed of the shuttle decreases further to e.g. 0.5 m/s. It is even possible, before the shuttle moves form the platform, to accelerate it. When accelerating/decelerating and keeping a forward velocity at the lifting platform, it is possible to have a time table with a higher frequency. The lifting platform can cover level 3 completely, including the ramps 5. FIG. 7 shows a preferred embodiment of the shuttle 2 in front view. This it especially suited for use in combination with a course according to FIG. 5, in which the wheels 16 are directly supported by the guides (in this situation having a railway type shape). The situation is shown in which the shuttle is moving on the guides 6, 7, the front and back wheels having a different gauge. Supporting rolls 17 are shown, to centre the wheels 16 on the guides 6, 7. A cable clamp 18 is shown as well, which is constructed as usual for e.g. cable lifts in downhill skiing areas. With this clamp the shuttle can be locked or unlocked to a (ususally endless) propulsion cable or equivalent flexible pulling element, moving with a substantially constant forward velocity. The cabin 22 of the shuttle is shown as well, providing room for e.g. twenty passengers (to stand or/and to sit), and all sides of it are transparent, such is usual with e.g. cabins of cable lifts in downhill skiing.

FIG. 8 shows an alternative for the embodiment of FIG. 3, using a pivoting system of rods 19. The upper position of the ascending platform 11 (to the left in the drawing) respectively descending platform 11' (to the right in the drawing) is shown with broken lines each time. By decelerating the shuttle 2 if it rests on the ascending platform 11, kinetic energie is generated by the shuttle to bring the platform 11 to level 3. For the descending platform 11 use can be made of the potential energy from the shuttle 2. Again it is possible to make sure that the shuttle keeps a forward velocity when going to level 3, which is advantageous for the comfort.

Finally in FIG. 9 a further alternative for lifting a shuttle is shown, that can be used either with substantial vertical lifting (e.g. according to FIG. 6), or with inclined lifting (e.g. according to FIG. 3, 4 or 5). At both sides of the track, and so of the shuttle 2, there is an enless actuator 20 each time, having one or more supports 21 (in this embodiment two supports 21 each time). The supports are active in pairs; one at each actuator 20. With the actuators 20 active, one pair of supports 21 moves upward (to arrive at level 4 from level 3: downward), and takes shuttles 2 with it. With more than one pair of supports 21, a higher frequency of lifting/lowering is possible.

The shuttle 2, or a replacing transport element, can for instance be used to lift a ship over a dike as well. The shuttle is then a wheeled dock. The transport distance for the dock will usually be restricted to the immediate vicinity of the dike. Further embodiments are feasibel as well, for instance on the basis of the combination of one or more features of the ones that are described here. It is possible as well, to e.g. make the cabin tilting to the front and the back when connected to a support along the track. During lifting/lowering the cabin is tilted then to keep it horizontal. However, that demands for a complex system, requiring much space (height), such that it is less appropriate for a compact structure and/or a comfortable transport at relatively high speeds.

It will be understood that for the indication of directions, such as above, below, up, down, lift, lower, descend, the opposite indication (below, above, down, up, descend, ascend, lift) can be used too. It is preferable to have the levels bridged immediately upstream and downstream from a station. It is preferable as well that the part of the transport course for bridging the levels, except for the connection to the further part of the course, has a substantial constant inclination. If a lifting mechanism is used, it is acting with e.g. chains, cables, hydraulic jackets, toothed gear wheels, friction wheels, etc.

What is claimed is:

1. Transport system with a transport track along which one or more transport elements (cabins) are moveable, said track running over a substantial horizontal distance, and at least two horizontally spaced stations, for loading and unloading persons and/or goods from the cabin, said stations being at a different vertical level of at least several meters, and the transport track bridges the said level difference through a relatively steep course and preferably the transport track and/or the cabin are mutually adapted such that the passenger comfort is secured along the part of the track where the level difference is bridged.

2. Transport system with a transport track along which one or more cabins are moveable, said track running over a substantial horizontal distance, and at least two horizontally spaced stations, said stations being at a different vertical level of at least several meters, the transport track bridging the level difference through a relatively steep course, the transport track and the cabin being mutually adapted such that passenger comfort is secured along the part of the track where the level difference is bridged:

wherein the cabin has horizontally fixed supports and moveable supports capable of moving inward and outward and the part of the track wherein the level difference is bridged comprises two separate pairs of subtracks vertically and laterally displaced from one another, said two separate pairs of subtracks merging together where the transport track reaches a horizontal level, and wherein the movable supports are structured and arranged to follow one of the two separate pairs of subtracks and the horizontally fixed supports are structured and arranged to follow another of the two separate pairs of subtracks.

3. The transport system of claim 2, wherein in the bridging part the transport track has a length such that the cabin can maintain a preferably substantial forward velocity at all points when bridging the levels.

4. Transport system comprising a moving vehicle having:

a first support member and a spaced second support member;

a first stationary guide and carrier means running over a substantial horizontal distance for directing and carrying said moving vehicle in a substantially horizontal path at a first level;

a second stationary guide and carrier means for directing and carrying said moving vehicle in a path at a second level, vertically spaced from said first level over at least several meters and comprising at least two horizontally spaced stations for loading and unloading persons from said moving vehicle; and a third stationary guide and carrier means for directing and carrying said moving vehicle in a third path converging with said first and second path, said first, second and third guide and carrier means supporting said moving vehicle horizontally balanced by bearing its spaced support members, said third guide and carrier means having a first track means and a second track means, vertically and laterally spaced from said first track means, said first and second track means merging together with the first stationary guide and carrier means as the first level and merging together with the second stationary guide and carrier means as the second level, said first track means bearing said first support member and said second track means bearing said second support member of said moving vehicle while being guided and supported by said third guide and carrier means to keep said vehicle horizontally balanced while moving along said third path.

5. The transport system of claim 2, wherein the inclination of the course that is followed by the transport track to bridge the level difference at no point exceeds 45°.

6. A system according to claim 4, wherein at least one of said first and second track means continues in said first guide and carrier means to continue to support at least one of said first and second support members along said first path.

7. A system according to claim 6, wherein at least one of said first and second track means continues in said second guide and carrier means to continue to support at least one of said first and second support members along said second path.

8. A system according to claim 4, wherein at least one of the first and second guide and carrier means are arranged relative to the third guide and carrier means to effect direct transfer of the moving vehicle to said third guide and carrier means.

9. A system according to claim 4, wherein the first, second and third guide and carrier means are provided such that the moving vehicle can move from said first level to said second level, by disengaging from said first guide and carrier means, than engaging said third guide and carrier means to move along said third path and finally disengaging said third guide and carrier means to engage said second guide and carrier means.

10. A system according to claim 4, wherein said first guide and carrier means comprises a track means and said second guide and carrier means comprises a track means, which track means are provided to carry at least one of said first and second support means of said moving vehicle and are end-to-end coupled to a track means of said third guide and carrier means.

11. A system according to claim 4, wherein said first and second track means have an extension such that they completely bridge the gap between the first and second path.

12. A system according to claim 4, wherein said first and second track means are provided by rails.

13. A system according to claim 4, wherein at least one of the first and second support member of the moving vehicle is a running wheel.

14. A system according to claim 4, wherein said third guide and carrier means is stationary.

15. A system according to claim 4, wherein said third path is steep.

16. A system according to claim 4, wherein said moving vehicle has a longitudinal direction and wherein said second support member is longitudinally spaced from said first support member.

17. A system according to claim 4, wherein said support members have a fixed level relative to said moving vehicle.

18. A system according to claim 4, wherein said first support means of said moving vehicles is sideways retractable.

* * * * *